United States Patent [19]

Neukermans et al.

[11] 4,010,366
[45] Mar. 1, 1977

[54] MEASUREMENT OF THE MASS AND CHARGE OF CHARGED PARTICLES

[75] Inventors: Armand P. Neukermans, Palo Alto, Calif.; Dale R. Ims, Rochester, N.Y.

[73] Assignee: Xerox Corporation, Stamford, Conn.

[22] Filed: Sept. 22, 1975

[21] Appl. No.: 615,612

[52] U.S. Cl. .............................. 250/282; 250/252
[51] Int. Cl.² ........................................ H01J 39/34
[58] Field of Search .......... 250/281, 282, 291, 397, 250/252

[56] References Cited
UNITED STATES PATENTS 3,842,267  10/1974  Genequand .................. 250/291

*Primary Examiner*—Alfred E. Smith
*Assistant Examiner*—B. C. Anderson
*Attorney, Agent, or Firm*—James J. Ralabate; James Paul O'Sullivan; Jerome L. Jeffers

[57] ABSTRACT

Disclosed is a method for the measurement of the mass and/or charge of a charged particle. The method involves injecting the particle into a sampling device made up of a tube comprising a Faraday cage with a region of a grounded conductive material on either end of it. The particle flows through the tube in a stream of gas and as it passes through the Faraday cage it induces a charge on the cage wall. By measuring the magnitude of the induced charge or its duration in the cage, the magnitude of the charge on the particle or the mass of the particle can be determined.

8 Claims, 5 Drawing Figures

MEASUREMENT OF THE MASS AND CHARGE OF CHARGED PARTICLES

BACKGROUND OF THE INVENTION

Conventional mass spectrometry is a technique for converting molecules into ions and then separating the ions according to mass/charge ratios. The ions are accelerated by a strong electrostatic field and, in a time-of-flight spectrometer, ions of different mass/charge ratio are separated by the difference in time they require to travel over an identical path from the ion source to a detector electrode which are situated at opposite ends of an evacuated tube.

In some situations, it is desirable to measure the mass and/or the charge of particles which are not readily ionized. In addition, it may be desirable to measure the particle's natural or acquired charge without altering it by ionization. For instance, it is desirable to know the electrostatic charge and mass of toner particles used in xerography. This is the case because use of toner particles of a size and/or charge not in accord with specifications has a detrimental effect on the quality of copies produced by xerographic copying.

It is an object of the present invention to provide a novel method for measuring the mass and/or charge of charged particles.

It is a further object to provide such a method which can be used to measure the mass of charged particles which are not necessarily ionic in nature.

An additional object is to provide such a method whereby the magnitude of the particle's charge and its mass can be measured in a single operation.

SUMMARY OF THE INVENTION

These and other objects are accomplished by the present invention in which the mass of a particle is measured simultaneously or sequentially with the charge. After such measurement, the charge and mass of individual toner particles are recorded and a spectrum of each accumulated. The invention has a capability of measuring a charge greater than $3 \times 10^{-17}$ coulombs and particle size in the range of from 1 to 30 microns. Individual particles are measured at a rate of up to 10,000 per second.

The present invention is a method for measuring the mass and/or charge of a charged particle. The method involves:

a. providing a tubular member having a first region which is made of a grounded conductive material and a second region which is in the form of a Faraday cage, said first and second regions being separated by an insulator;

b. introducing the charged particle into the first region of said tube while causing a stream of gas to flow through the tube in a direction away from the first region and toward the second region to thereby cause the particle to be carried from the first region to and through the second region and induce a charge on the wall of the second region;

c. measuring the time the particle spends in the second region by measuring the duration of the induced charged and/or measuring the magnitude of the charge on the particle by measuring the magnitude of the induced charge; and d. obtaining the mass of the charged particle by determining the mass of the particle as a function of the time it takes to pass through the second region and/or obtaining the magnitude of the charge by determining the magnitude of the charge induced on the wall of the second region.

DETAILED DESCRIPTION AND PREFERRED EMBODIMENTS

Figure 1:
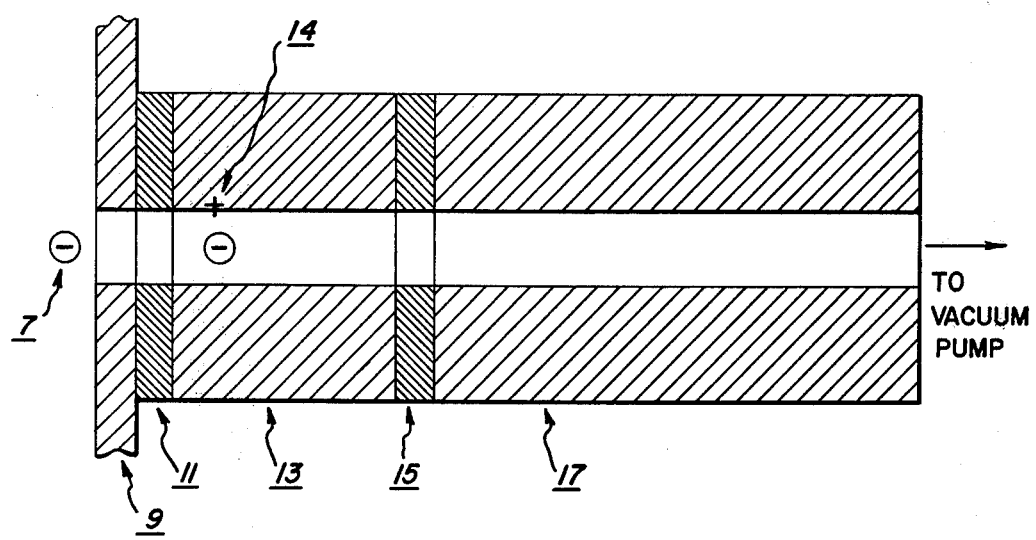
FIG. 1 is a representation of the sampling device used to determine the mass and/or charge of a charged particle by the method of the present invention.

The method by which the invention is carried out is illustrated by FIG. 1. Referring to FIG. 1, the negatively charged particle 7 is introduced to the first region 9 of a tubular member. The opposite end of this member is connected to a vacuum pump which causes the air or other gas in the member to flow in a direction away from the first region and toward the second region 13. The first region acts as an electrostatic shield for the second region. In so doing, it insures that the second region will be unaffected by the particle until it enters the second region. A second purpose is to reduce the electromagnetic noise induced in the second region. It is necessary that the first region be made of a conductive material and that it be grounded. The first and second regions are separated by an insulator.

The gas flow carries the particle through the first region 9 and into the second region 13 of the tubular member which is in the form of a Faraday cage. The Faraday cage is a cylindrical region constructed of a metallic tube whose dimensions are such that the particle is essentially completely enclosed in the tube during its traversal therethrough. Under these conditions, the charge on the particle induces on the cage an essentially equal and opposite charge. The charged particle will induce a charge 14 on the wall of the Faraday cage which is electrically connected to the input of a charge-sensitive amplifier depicted as item 27 in FIG. 2. The amplifier may be, for example, a Tennelec TC-161D which presents, at its output, a voltage proportional to the particle's charge so long as the particle is in the Faraday cage. Referring again to FIG. 2, this low level signal is further amplified at amplifier 29, run through a band pass filter 31 to remove unwanted low and high frequency noise and presented to a suitable storage or recording device 33.

Figure 3:
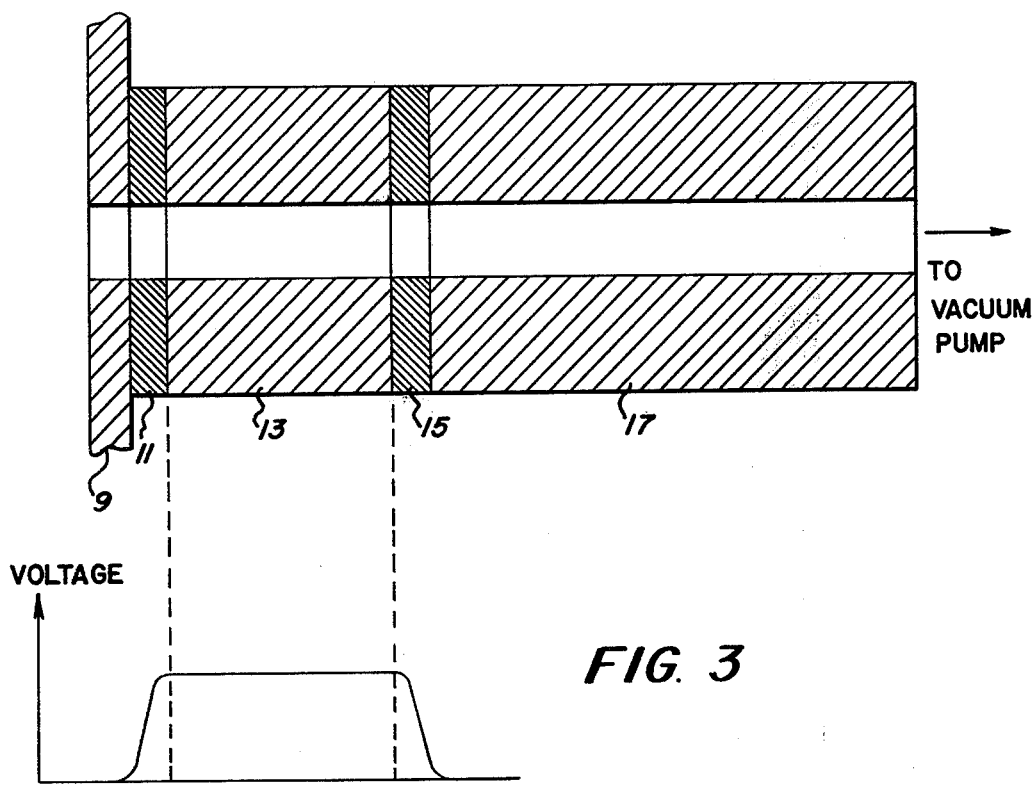
FIG. 3 shows a schematic of the electronic signal as a function of particle position.

Upon leaving the second region, the particle normally enters a third region of the tubular member depicted as item 17 in FIG. 1 which is separated from the second region by insulator 15. The third region serves the same purpose as the first, to shield the second region. FIG. 3 shows a schematic of the electronic signal as a function of particle position.

The invention is based in part on the principle that small particles are more readily accelerated by fluid flow than are large particles. By design, all particles, except very small ones, are still accelerating as they pass through the Faraday cage section. The time required for a particle to traverse the Faraday cage section is an indication of particle size or mass; larger, more massive particles require a longer transit time.

The voltage signal at the output of the charge-sensitive amplifier contains information on particle size or mass (pulse length) and particle charge (pulse amplitude). Both measurements can be made simultaneously on individual particles utilizing a suitable electronics package. In addition, the measured quantities may be manipulated, for example, the charge divided by the diameter to give mobility. The measured or manipulated variables may then be stored and measurements on a large number of particles accumulated to generate a spectrum of the desired parameter.

The device may be calibrated for measurement of either particle size or particle mass by:

1. calculating transit times for particles of the size or mass range of interest, or
2. introducing particles of known size or mass and measuring the transit time.

The calibration for particle charge is accomplished by providing a known charge pulse to the input of the charge-sensitive amplifier and observing the output signal amplitude. This is readily accomplished by connecting a small capacitor ($\sim$ 1 p.f.) between a pulse generator and the input to the charge sensitive amplifier. The amount of charge injected is then:

$$Q_{in} = V_p C$$

since the input to the charge sensitive amplifier is held at virtual ground potential.

Figure 2:
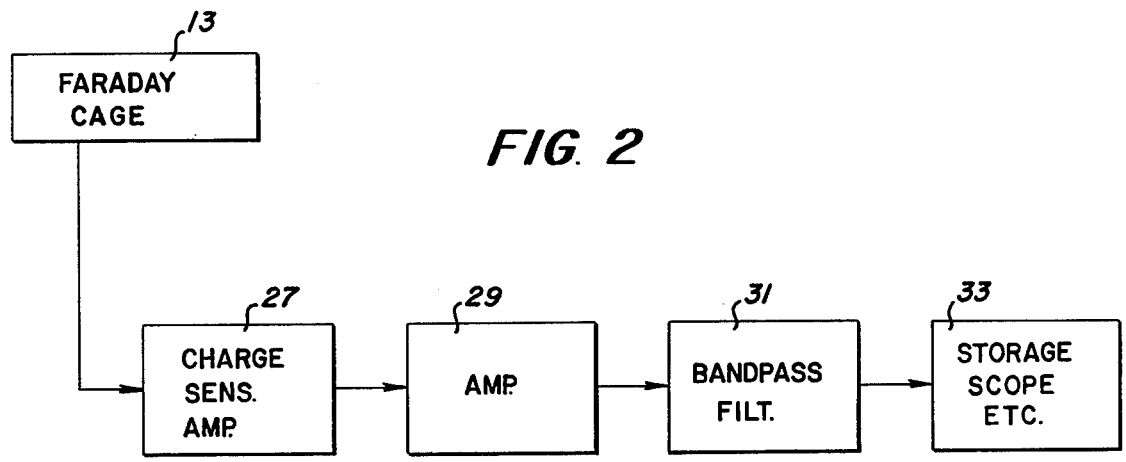
FIG. 2 is a schematic representation of a system capable of measuring the mass and/or charge of a charged particle using the pulse generated when the particle passes through the sampling device depicted in FIG. 1.
Figure 4:
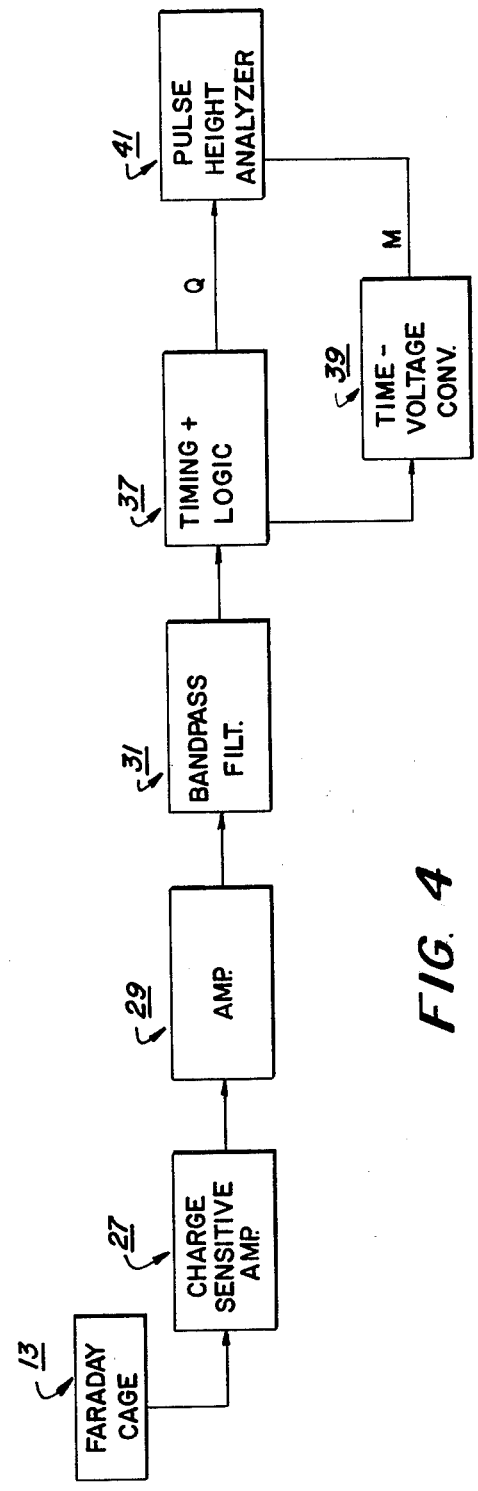
FIG. 4 is a schematic representation of a system capable of measuring sequentially the mass and charge of a charged particle using the pulses generated when the particle passes through the sampling device depicted in FIG. 5.

A functional diagram of a system capable of measuring both particle charge and mass is shown in FIG. 4. The first four elements of this device are shown in FIG. 2 and their purpose remains unchanged. The timing and logic element serves two purposes:

1. selecting which pulses are to be measured, and
2. providing the timing signals for the mass-measurement section. The first function is necessary to insure that all measured particles are measured correctly. The criterion applied to determine acceptable signals is that there be no signal due to electronic transients, noise, etc., for a short period ($\approx$ 5 $\mu$ sec.) before the accepted signal. The second function is to supply the time-to-voltage converter 39 with timing signals indicating the beginning and end of accepted particle signals.

The timing and logic element sends a signal (pulse) proportional to particle charge directly to the pulse height analyzer 41. The pulse height analyzer determines the height of the pulse and adds one count into the channel corresponding to that amplitude.

The time to voltage converter accepts start and stop signals from the timing and logic element and generates an output pulse whose amplitude is proportional to the particle pulse length. The time-to-voltage converter output pulse is sent to a second storage region in the pulse height analyzer 41 or a second pulse height analyzer. Here, a spectrum of particle traversal time is accumulated. This spectrum may be calibrated by the aforementioned techniques to give a particle size or mass spectrum.

The particle charge and mass signals can be manipulated by analog or digital means to produce spectra in Q/m, Q/d, Q/d$^2$, m/Q, d/Q, d$^2$/Q, etc. Further, where particles of + and − charge are encountered, the spectra may be split to give a + charge and − charge spectrum as well as the corresponding mass or size spectrum for the + and − charged particles.

Figure 5:
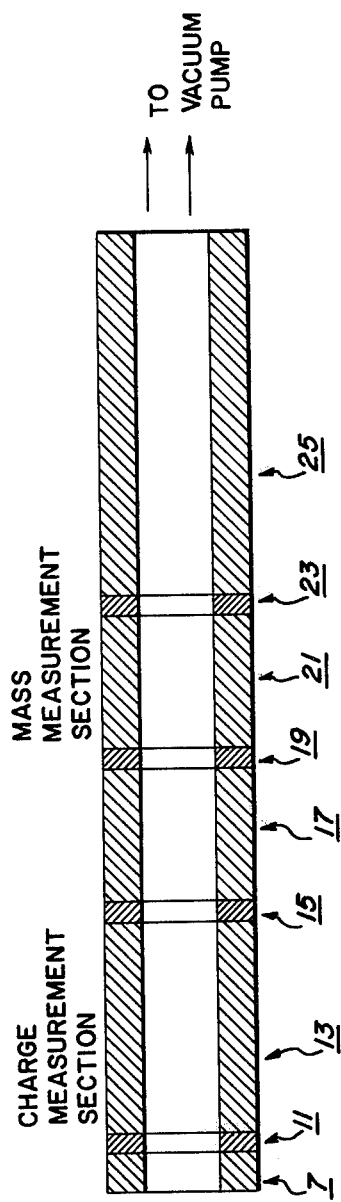
FIG. 5 is a representation of a sampling device capable of determining both the charge and mass of a charged particle by the method of the present invention.

A device with which mass and charge of a particle can be measured sequentially is depicted in FIG. 5. In this device, the charged particle is drawn into the first region or inlet shield 7 by gas flowing through the device. The particle is accelerated by the fluid drag force through the insulator 11, charge measurement section 13, insulator 19, mass measurement section 21, insulator 23 and outlet shield 25.

The particle charge is measured by connecting the charge measurement section to a charge sensitive amplifier and associated equipment as in the simultaneous technique.

The particle mass is inferred from particle transit time as before. In this configuration, however, the time required for the particle to traverse any of several distances may be selected. For example, one may use the length of the mass measurement section, the length between the charge and mass measurement sections, the length from the front of the charge measurement section to the end of the mass measurement section, the length between the front of the charge measurement section to the front of the mass measurement section or the length from the end of the charge measurement section to the end of the mass measurement section.

In this manner, both particle mass and charge can be measured in a single, sequential operation.

The charge, mass and perhaps the ratio of the two (Q/m) of the toner particles used in xerography have a direct effect on an electrostatographic copying machine's performance. The use of toner of the wrong sign (incorrect charge polarity) gives rise to a halo around the image. Low charge toner is implicated in background development and dirt level in the machine. Undersize toner causes photoreceptor filming as well as developer failure while the use of oversize toner decreases image sharpness. These and other problems caused by incorrect toner size or charge necessitate a means of measuring same to enable process or material control to compensate for or eliminate them.

The method of the instant invention is used to determine toner size and charge by removing toner from the developer by use of an air blast or a vibration-assisted air blast. The blown off toner particles are then sampled by drawing them through the pickup probe as in FIG. 1. An accumulated spectrum of number-vs-particle charge and number-vs-mass or any combination thereof may be obtained.

The method of practicing the invention is further explained by the following examples.

EXAMPLE I

A sampling device of the type illustrated by FIG. 1 is constructed with an inlet section 9 of 0.005 inch brass foil with a 0.006 inch diameter hole. Behind this section, and assembled on the axis of the hole in the inlet section, are an epoxy insulator 11 (approximately 0.005 inch thick), a 0.006 inch inside diameter × 0.022 inch outside diameter × 0.5 millimeter long hypodermic tube section serving as the Faraday cage 13, a second epoxy insulator 15 and a longer hypodermic tube section as previously described. A small wire connects the Faraday cage section to an output connector, and an overall brass shield encloses an electrically connects the inlet and outlet sections. This housing is connected to ground potential.

The output of the sensing probe is connected to the inlet of the charge sensitive amplifier which is a Tennelec TC-161D having a gain of $5.5 \times 10^{12}$ volts/coulomb. This is followed by a Princeton Applied Research Model 211 Amplifier set at a gain of 200. Following this is a low-pass filter with a corner frequency of 200 $KH_z$. Next, a Tennelec TC 611 Baseline Restorer acts as a high pass filter in addition to restoring the D.C. baseline.

The timing and logic element contains threshold detectors for both positive and negative signals, logic for selecting accurately measurable input signals and timing pickoff for the time to voltage converter.

An Ortec Model 437A Time to Pulse Height Converter, specially modified to enable maximum pulse length of 800 $\mu$/sec. measurement capability, is employed. The storage device is an Ortec Model 6220 Multichannel Analyzer.

The air flow through the sensing device is adjusted to give a velocity of 50 m/sec.

The device is used to sample an aerosol of toner produced by blowing the toner from a small amount of xerographic developer with an air jet. A spectrum of number-vs-transit time is accumulated and displayed by the Multichannel Analyzer.

The transit time spectrum may be converted to an approximate size spectrum by using a calculated conversion chart. Such a chart appears below and is compiled as follows: an equation is derived relating particle position with time in the sampling device; a family of curves of position-vs-time are drawn for particles of various sizes in the range in interest; the transit time is determined from the curves as that time required for a particle to travel from the inlet of the Faraday cage to the outlet.

The derived equation has the form:

$$X = V_{air} [t + 1/B (e^{-Bt} - 1)], \text{ where}$$

X = position in centimeters
$V_{air}$ = air velocity in sampling probe $$B = 9/2 \ z/\phi R^2$$

z = air viscosity
$\phi$ = particle density
R = particle radius
t = time

The above equation is derived using the following assumptions:
1. the particle has negligible velocity before it enters the sampling probe, and
2. the accelerating force on the particle is due to Stoke's air drag [$F = 6\pi \ z \ RV$].

Utilizing the procedure, as described above, the following chart for particles of $\phi = 1.1$ gm./cm.$^3$ is prepared:

| R($\mu$m) | $T_t$ ($\mu$ sec.) |
|---|---|
| 1 | 13 |
| 2 | 21 |
| 3 | 29 |
| 4 | 38 |
| 5 | 46.5 |
| 6 | 55 |
| 7 | 63.5 |
| 8 | 72 |
| 9 | 80 |
| 10 | 88.5 |
| 11 | 97 |
| 12 | 106 |
| 13 | 114.5 |
| 14 | 122.5 |
| 15 | 131 |

Thus, by measuring the transit time of particles of unknown size, their sizes can be determined from the chart.

EXAMPLE II

The sampling device and apparatus described in Example I is retained. The timing and logic element, however, in this case, contains peak detectors for both positive and negative signals. These peak detectors store and hold the maximum signal amplitude for each signal. If the logic element has judged the measured signal to be accurately measurable, the signal level on the peak detector is sampled and sent onto the pulse height analyzer. The timing and logic element resets the peak detector to zero after the data has been transferred and the input signal has decayed.

The pulse height analyzer receives voltage pulses from the timing and logic element and stores them in appropriate amplitude bins or channels. Since the signal amplitude is proportional to particle charge, the pulse height spectrum acquired by the pulse height analyzer is actually a particle charge spectrum.

The charge spectrum is best calibrated by injecting a known charge into the charge-sensitive amplifier and observing where the output appears in the pulse height analyzer. For example, a 1 millivolt signal fed through a 1 pico-farad capacitor to the input of the charge sensitive amplifier results in a charge signal of: ($10^{-3}$ volts) ($10^{-12}$ farad) = $10^{-15}$ coulomb.

If this signal is stored in channel 100 of the pulse height analyzer, channel 10 would correspond to a charge of $10^{-16}$ coulombs.

In the examples, xerographic toner particles bearing a triboelectric charge are studied. The mass of particles bearing no charge can be measured by charging the particle, such as by the use of a corona discharge device, before it enters the measuring probe.

It is readily apparent to those skilled in the art that the charge and mass measurement operations can be made simultaneously by combining all the timing and logic functions. Likewise, it is apparent that although separate instruments are named for performing certain operations, for example, the charge sensitive amplifier, new instruments could be built to combine several of the operations. Further improvements in the sensitivity of the entire device are obtained by reducing the electronic noise at the charge sensitive amplifier.

What is claimed is:
1. A method of measuring the mass of a charged particle which comprises:
   a. providing a tubular member having a first region which comprises a grounded conductive material and a second region which is in the form of a Fara- day cage, said first and second regions being separated by an insulator;

b. introducing the charged particle into the first region of said tube while causing a stream of gas to flow through the tube in a direction away from the first region and toward the second region to and through the second region and induce a charge on the wall of the second region;

c. measuring the time the particle spends in the second region by measuring the duration of the induced charge; and d. obtaining the mass of the charged particle by determining the mass of the particle as a function of the time it takes to pass through the second region by comparing the time the particle spends in the second region with the time particles of known mass spend in the region under similar conditions.

2. The method of claim 1 wherein the tubular member has a third region of a grounded conductive material which is connected to the second region and separated therefrom by an insulator.

3. The method of claim 1 wherein the gas is air.

4. The method of claim 1 wherein the charged particle is a xerographic toner particle.

5. A method for measuring the charge of a charged particle which comprises:

a. providing a tubular member having a first region of a grounded conductive material and a second region in the form of a Faraday cage, said first and second regions being separated by an insulator;

b. introducing the charged particle into the first region of said tube while causing a stream of gas to flow through the tube in a direction away from the first region and toward the second region to thereby cause the particle to be carried from the first region to and through the second region and induce a charge on the wall of the second region;

c. measuring the magnitude of the charge induced on the wall of the second region; and d. obtaining the magnitude of the charge of the charged particle by determining the magnitude of the charge induced on the wall of the second region by the use of a peak detector which measures the magnitude of the charge induced on the wall of the second region and feeds this data to a pulse light analyzer which has been calibrated by observing its response to a known charge.

6. The method of claim 5 wherein the magnitude of the charge is determined by providing a charge-sensitive amplifier in operable connection with the wall of the second region and providing a known charge pulse to the input of the amplifier and comparing the output signal of the amplifier with the output signal obtained for the particle of unknown charge.

7. The method of claim 5 wherein the tubular member has a third region of a grounded conductive material which is connected to the second region and separated therefrom by an insulator.

8. The method of claim 5 wherein the charged particle is a xerographic toner particle.

* * * * *